United States Patent [19]

Stienbarger

[11] Patent Number: 5,395,100
[45] Date of Patent: Mar. 7, 1995

[54] CHAIN SAW VISE WITH IMPROVED MOUNTING STRUCTURE

[76] Inventor: Wayne L. Stienbarger, 27880 Michigan Ave., Mendon, Mich. 49072

[21] Appl. No.: 201,738
[22] Filed: Feb. 25, 1994
[51] Int. Cl.6 .............................................. B23Q 3/02
[52] U.S. Cl. .................... 269/101; 269/102; 269/249
[58] Field of Search ............. 269/102, 101, 246, 249; 76/36, 78 R, 78 A, 25 A; 51/217 R, 217 P; 411/400, 187–189

[56] References Cited

U.S. PATENT DOCUMENTS

| | | | |
|---|---|---|---|
| 3,309,119 | 3/1967 | Phillips | 411/400 |
| 3,589,706 | 6/1971 | Putman | 269/102 |
| 4,109,900 | 8/1978 | Vandecoevering | 269/102 |
| 4,248,412 | 2/1981 | DeRoy | 269/102 |
| 4,473,984 | 10/1984 | Lopez | 411/400 |
| 4,543,763 | 10/1985 | Ernst et al. | 411/187 |
| 4,949,446 | 8/1990 | Kuwica | 269/102 |
| 5,067,846 | 11/1991 | Staniszewski | 411/189 |

*Primary Examiner*—Robert C. Watson
*Attorney, Agent, or Firm*—Flynn, Thiel, Boutell & Tanis

[57] ABSTRACT

A chain saw vise includes a body of generally rectangular shape with an arcuate concave bottom surface defining downwardly projecting legs which each taper to a pointed edge. A lag screw has a head welded to a central portion of the arcuate surface, and has a downwardly projecting threaded shank. A circular hole extends transversely through the body. A slot with a width less than diameter of the hole extends transversely through the body, communicates with the hole, and opens through a top surface of the body. A threaded screw stud engages a threaded hole in the body, has its inner end disposed in the slot, and has a manually operable handle secured to its opposite end.

7 Claims, 2 Drawing Sheets

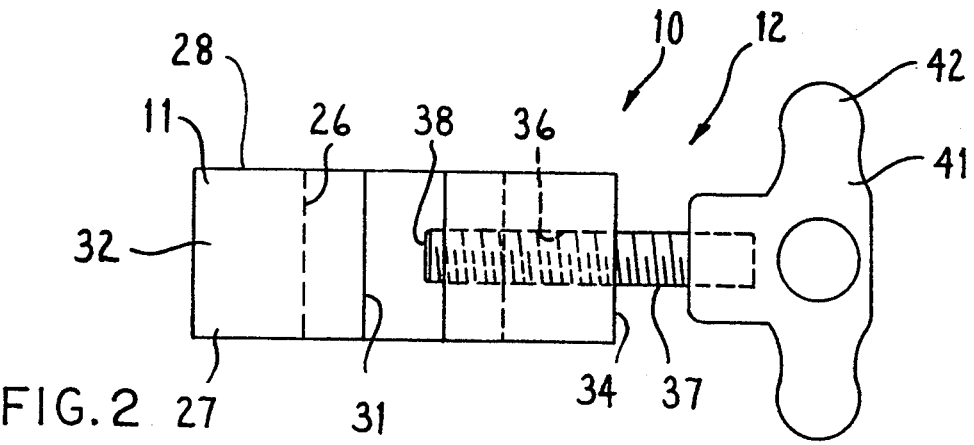
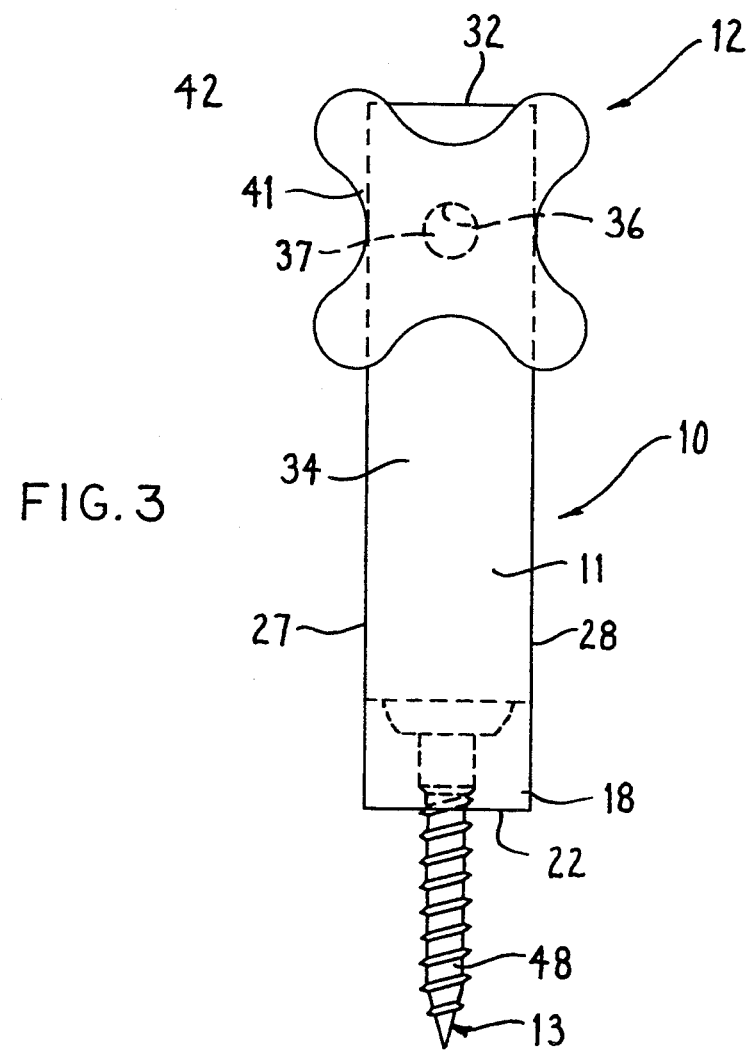

CHAIN SAW VISE WITH IMPROVED MOUNTING STRUCTURE

FIELD OF THE INVENTION

The present invention relates to a vise adapted to rigidly hold the blade of a chain saw during servicing such as sharpening of cutting elements on the chain.

BACKGROUND OF THE INVENTION

Any person who has ever used a chain saw is readily aware of the difficulty of holding a saw in a secure position while performing certain types of servicing. For example, filing or resharpening the cutting elements on the chain of the chain saw is difficult, because of the awkward position of the saw and the need to hold the saw very stable. This is particularly true when the servicing is carried out in the field, rather than in a service shop.

Consequently, a vise has previously been developed to rigidly hold the blade of a chain saw during such servicing. This known device includes a clamping mechanism for gripping the blade, and has several spikes which are similar to large nails and which can be driven into a piece of wood such as a log, a stump or a piece of timber, in order to anchor the device. Although this known vise has been generally adequate for its intended purposes, it has not been satisfactory in all respects.

More specifically, in addition to the vise itself, a large hammer or similar tool is usually required to drive the spikes into the piece of anchoring wood. Further, as a practical matter, it can be difficult to drive the spikes into a piece of wood even with a good hammer, because the spikes tend to back themselves out of the wood after they have been driven a half inch or so into the wood. Further, the forces exerted during the sharpening process often cause the spikes to progressively work loose within the holes in which they are disposed, as a result of which the vise becomes progressively more unstable, to the point where it may become necessary to remove and re-anchor it two or three times before the sharpening job is completed. This can be time consuming and aggravating, and often results in a poorer job than would otherwise be the case.

Accordingly, one object of the present invention is to provide an improved chain saw vise which can be installed without any need for an additional tool such as a hammer, which does not have a tendency to work its way back out of a piece of anchoring wood as it is being installed, and which will remain solidly anchored in the wood throughout the servicing operation, even if the wood is relatively soft.

A further object is to provide such a vise which is compact, and which fits easily in a tool box or in a case used to carry the saw.

A further object is to provide such a vise which is simple in structure and thus easy and inexpensive to mass produce, and which can be rapidly and easily installed in a piece of anchoring wood.

SUMMARY OF THE INVENTION

The objects and purposes of the invention, including those set forth above, are met according to one form of the present invention by providing an apparatus which includes: a body, a clamping arrangement for releasably gripping a blade of a chain saw, and a screw projecting outwardly from the body in a predetermined direction.

BRIEF DESCRIPTION OF THE DRAWING

A preferred embodiment of the present invention is described in detail hereinafter with reference to the accompanying drawings, in which:

FIG. 2 is a top view of the embodiment of FIG. 1; and

FIG. 3 is a side view of the embodiment of FIG. 1.

DETAILED DESCRIPTION

Figure 1:
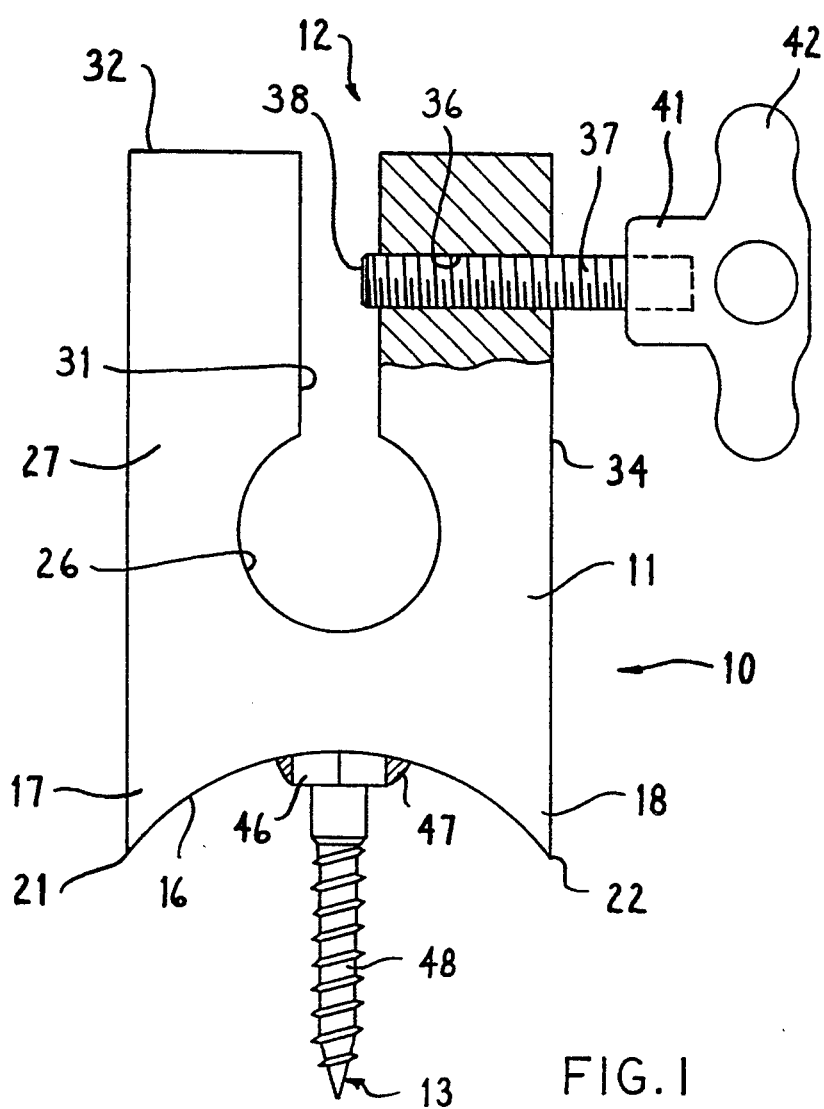
FIG. 1 is an elevational front view, partly in section, of a chain saw vise embodying the present invention.

FIGS. 1-3 depict a chain saw vise 10 which embodies the present invention. The chain saw vise 10 includes a body 11, a clamping mechanism 12, and a mounting screw 13.

Referring to FIG. 1, the body 11 is made of metal and is approximately rectangular in shape, except that it has an arcuate concave bottom surface 16 defining two spaced and downwardly projecting legs 17 and 18, the legs 17 and 18 each tapering to a pointed edge 21 or 22 as viewed in FIG. 1. As shown in FIGS. 1 and 2, the body 11 has a circular hole 26 extending through it from a front surface 27 to a back surface 28. Further, a slot 31 in the body 11 extends vertically from a top surface 32 to the circular hole 26, and opens through each of the front and back surfaces 27 and 28. The width of the slot is less than the diameter of the hole 26.

A threaded hole 36 extends horizontally through the body 11 from a side wall 34 to the slot 31. A screw stud 37 which is longer than hole 36 is threadedly engaged with the hole 36, and has an end 38 disposed within the slot 31. A manually operable knob or handle 41 is fixedly secured to the opposite end of the screw stud 37, and has four radially outwardly projecting arms 42.

The mounting screw 13 is a conventional lag screw which has a hexagonal head 46 welded at 47 to the concave arcuate bottom surface 16 of the body 11, and has a threaded shank 48 which projects downwardly intermediate and in the same direction as the legs 17 and 18.

OPERATION

In use, the mounting screw 13 of the vise 10 is screwed downwardly into a log, a stump or some other available piece of timber until the pointed edges 21 and 22 of the legs 17 and 18 engage and dig into the log. The handle 41 is rotated, if necessary, so as to move the end 38 of the screw stud 37 out of the slot 31, and then the blade of a chain saw is inserted downwardly into the slot 31 until the chain on the blade extends through and is movable within the hole 26. The handle 41 is then rotated in the opposite direction so that the end 38 of the screw stud 37 engages the blade and clamps it against the opposite wall of the slot 31, in order to fixedly hold the blade in place.

The cutting elements on the chain can then be sharpened in a conventional manner using any conventional sharpening apparatus, and the chain can be moved relative to the blade during the sharpening process because it can move within the hole 26 even though the blade is fixedly clamped in the slot 31. The legs 17 and 18 provide support and stability to the vise which facilitates the sharpening process and also substantially prevents the screw 13 from developing play within the log in which it is disposed, especially when the log is relatively soft wood.

When the sharpening operation is completed, the handle 41 is rotated so as to move the screw stud 37 outwardly to loosen the blade, and then the blade is extracted from the vise. The vise 10 can then be removed from the log or other object by rotating it so as to extract the screw 13.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

What is claimed is:

1. A chain saw vise, comprising:
   a body having integrally provided thereon a pair of spaced apart legs projecting in a common direction outwardly from said body and each terminating at a distal end thereof in a pointed edge construction, said pointed edge constructions being adapted to dig into a support surface when mounted thereon;
   a screw having a threaded shank projecting outwardly from said body in a direction parallel to said common direction, said screw being oriented intermediate said pair of legs and said threaded shank thereof extending beyond said distal ends of said legs;
   a clamping means on said body for releasably gripping a blade of a chain saw;
   whereby a turning of said screw into the support surface will eventually cause said pointed edge constructions at said distal ends of said legs to dig into said support surface to stabilize said body on said support surface.

2. The chain saw vise according to claim 1, wherein said body has a concave arcuate surface thereon extending between said legs, said screw having a head welded to a central portion of said concave surface, and said legs being provided in the region of opposite ends of said concave surface.

3. An apparatus according to claim 2, wherein each said leg tapers progressively in said common direction.

4. An apparatus according to claim 1, including a slot extending through said body, a threaded hole in said body which opens at one end into said slot and opens at an opposite end through an outer surface of said body, a screw stud threadedly engaging said threaded hole and having an end portion disposed in said slot, and manually operable means for rotating said screw stud.

5. An apparatus according to claim 4, wherein said means for manually rotating said screw stud includes a manually operable handle fixedly secured to an end of said screw stud remote from said slot.

6. An apparatus according to claim 4, including an opening extending through said body, having a larger cross sectional dimension than said slot, and communicating with said slot at an inner end of said slot.

7. The chain saw vise according to claim 4, wherein said slot is on a side of said body remote from said legs and said screw.

* * * * *